United States Patent Office 3,509,539
Patented Apr. 28, 1970

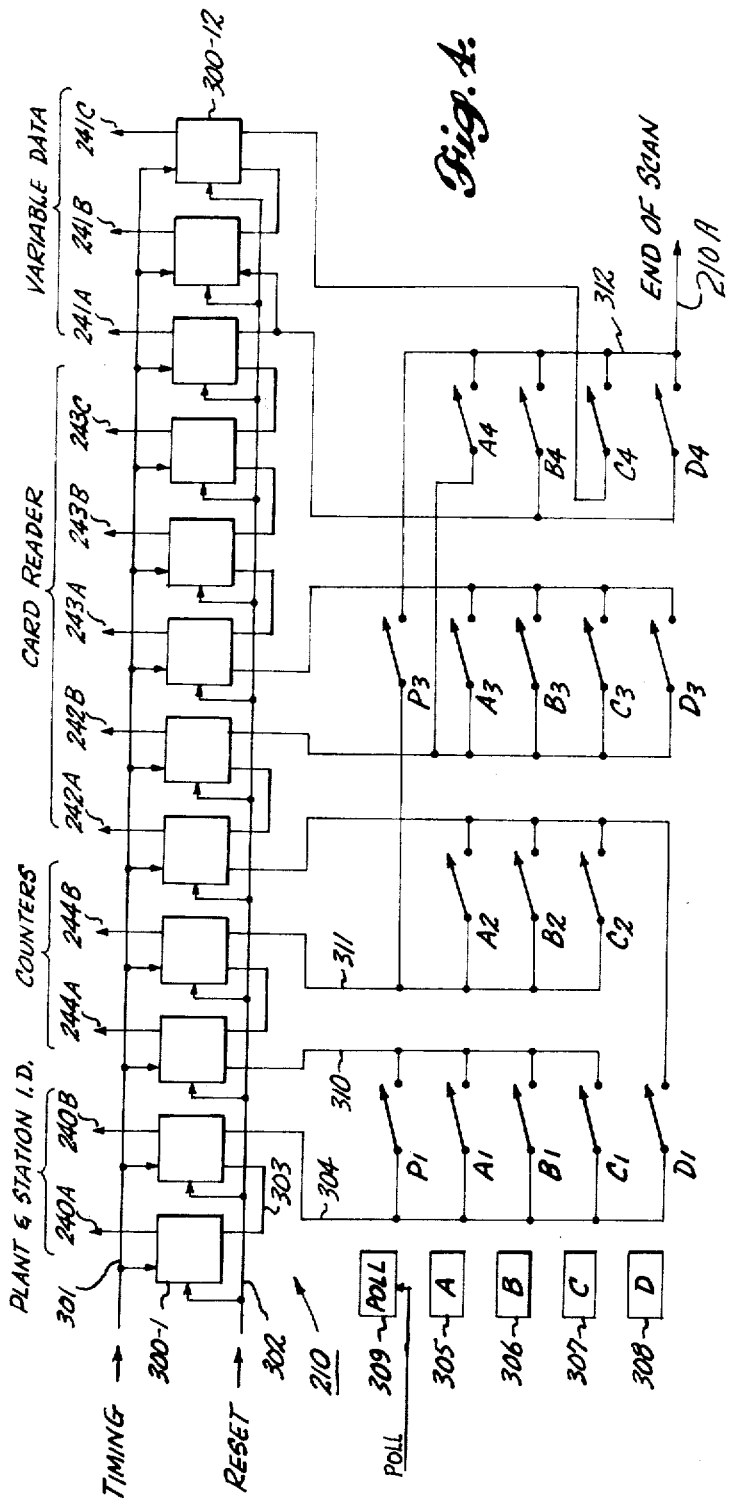

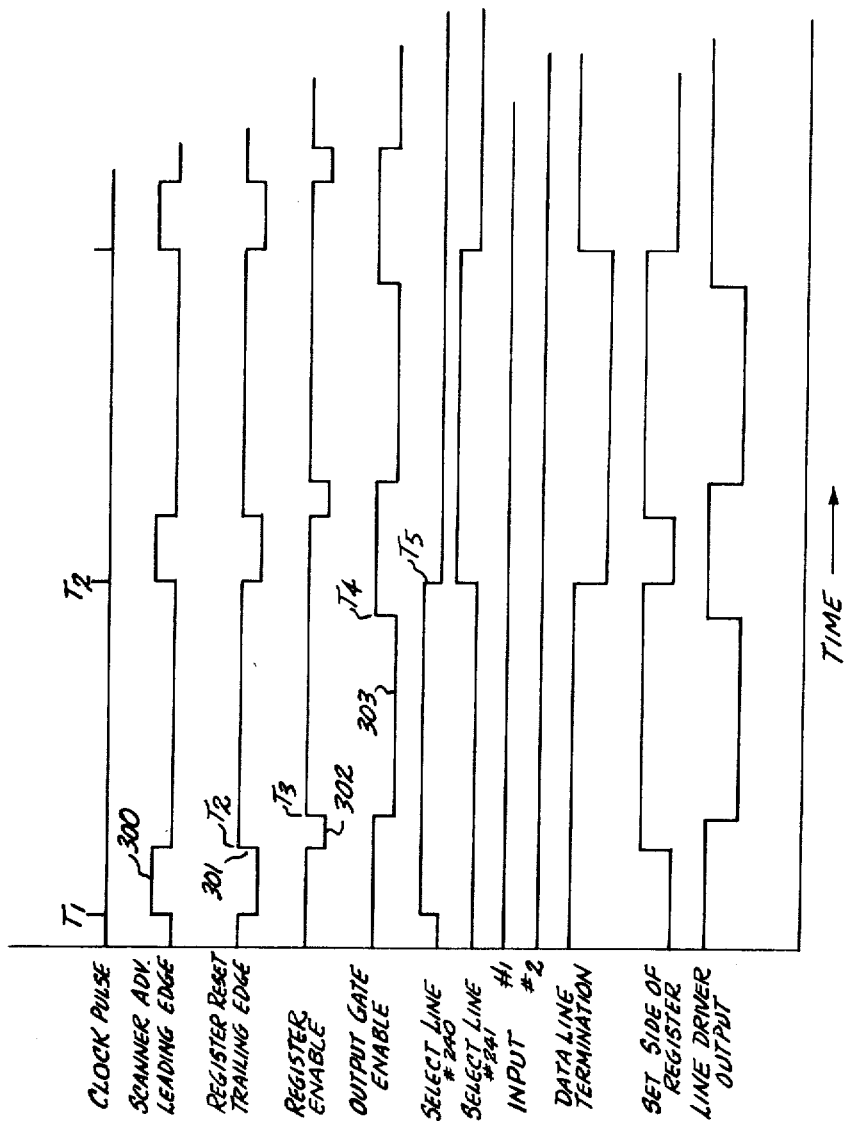

3,509,539
MANUFACTURING PLANT DATA ACQUISITION SYSTEM
James P. Fichten, Elmhurst, and Jack R. Gallet, Hickory Hills, Ill., assignors to Weyerhaeuser Company, Tacoma, Wash., a company of Washington
Filed Dec. 18, 1967, Ser. No. 691,601
Int. Cl. G06f 9/00
U.S. Cl. 340—172.5                       15 Claims

ABSTRACT OF THE DISCLOSURE

An improved system is disclosed for accumulating manufacturing data regarding multiple stations throughout one or more manufacturing plants through the use of a central data recorder or accumulator. The system makes use of a plurality of data acquisition or collector stations located throughout the plant or plants which are to be monitored. Each collector station is provided with the necessary input devices to provide to the central accumulator the fixed, semivariable, and variable data needed for proper management and operation of the given plant or plants. When the operator at the collector station presses a transmission request switch a scan operation is initiated at the central accumulator with the accumulator station going through a search mode of operation to locate the collector station having data to be transferred to the central accumulator. Once the collector station has been so located, the central accumulator locks onto that collector and by way of a control signal initiates the transmission of data from the collector station. The collector station itself includes a program control which permits a number of selected sequencies of desired data to be transmitted to the central accumulator. Through the use of a unique interrelationship of program scanning devices in the transmitting and collecting stations, the number of lines required for a central accumulator to control and receive data from a large number of data collection stations is minimized. The system also includes an automatic poll control whereby the central accumulator serves to periodically poll all collector stations in a predetermined sequence. Thus management can be assured of having available plant data on an updated basis of selected periodicity.

---

In many industries it would be advantageous for management to have updated data regarding various aspects of the manufacturing processes being carried out throughout one or more plants. For example, in the paper container manufacturing industry it is essential that the footage of paper used, the number of a given type of container which has been fabricated, and other related data such as employee time on a given job be provided on an updated basis. This permits forecasting of the manufacturing capabilities of the plant as well as providing data regarding wasteage, plant efficiency, and the other factors essential to efficient plant operation. With the widespread usage of automated data processing equipment, many industries already have on hand the necessary equipment for processing raw data to provide management with the desired information regarding plant operation. However a need exists for equipment to efficiently obtain and provide to a central location the raw data from the various locations in one or more plants of a large facility. It is thus an object of the present invention to provide such a data acquisition system. Another object of the invention is to provide an improved low cost data acquisition for deriving manufacturing data from multiple locations in one or more manufacturing plants regarding the operations being performed at such locations.

An additional object of the present invention is to provide a central data accumulation system in combination with a plurality of data collector stations with the collector stations being tied electrically by a minimum number of common lines to the central data accumulating station.

An additional object of the present invention is to provide an improved data acquisition system utilizing a central recorder station for recording in preselected sequence the raw data generated at a plurality of data collection stations with such systems having appropriate interlocks for assuring correct equipment operation and yet maintaining the number of line connections from the central accumulator to the data collection stations at a minimum.

Another object of the present invention is to provide an interlocked control system wherein an operator at a data collector station can initiate the transfer of data to a central accumulator and wherein an operator at the central accumulator can initiate a polling operation to obtain data from all stations of the system.

The above as well as additional advantages and objects of the present invention will be more clearly understood from the following description when read with reference to the accompanying drawings and wherein, FIGURE 1 is a block diagram illustrating the central data accumulating section of the improved system.

FIGURE 4 is a block diagram of one scanner and program section of the collector system of FIGURE 2 showing the manner in which the utilization of settable ring counters in combination with settable switches simplifies the manufacture and operation of the data acquisition system of the present invention.

FIGURE 5 is a chart showing the program for the collector station of FIGURE 4.

FIGURE 6 is a timing diagram for a collector system such as shown in FIGURE 2.

Figure 1:
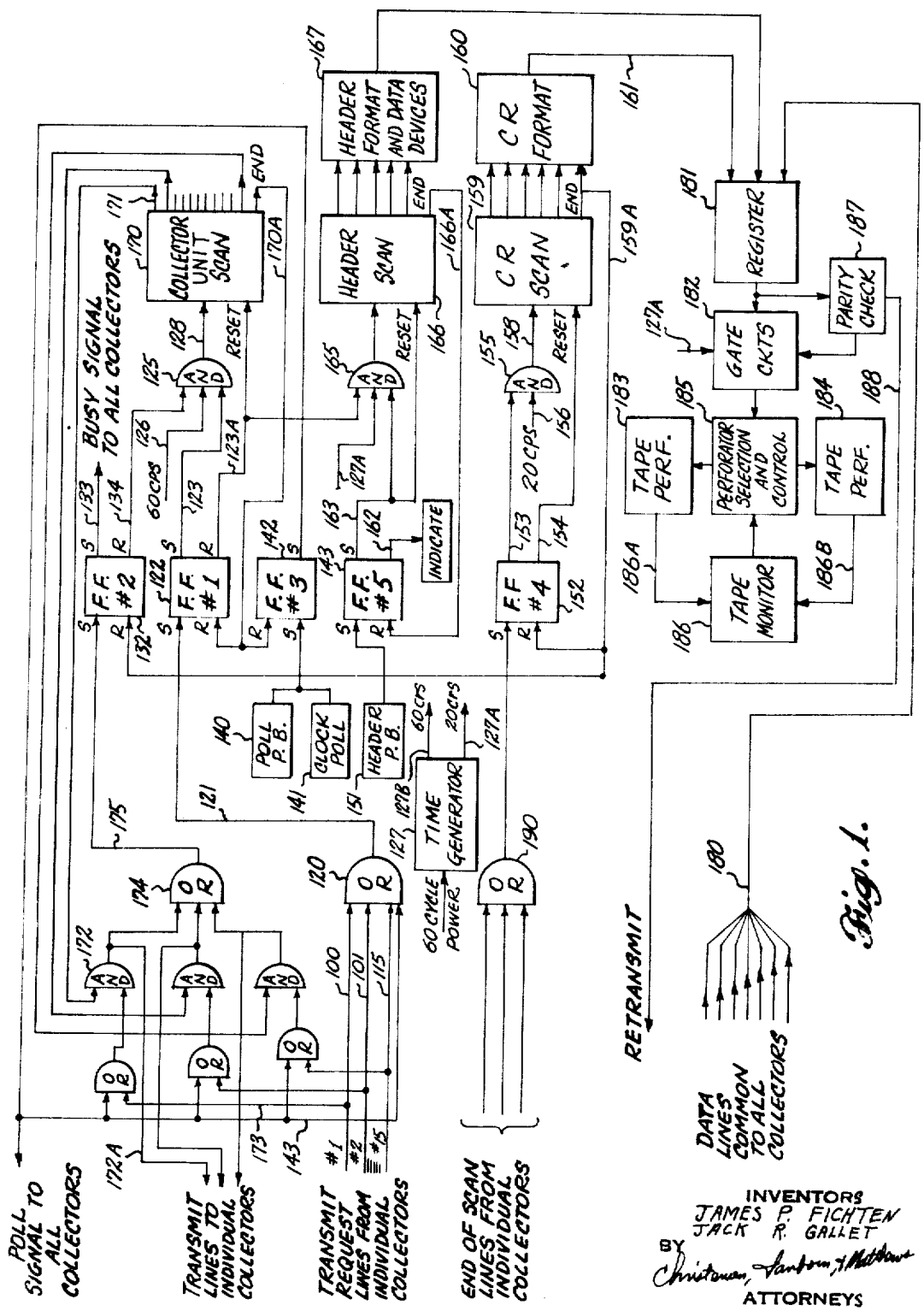
Figure 2:
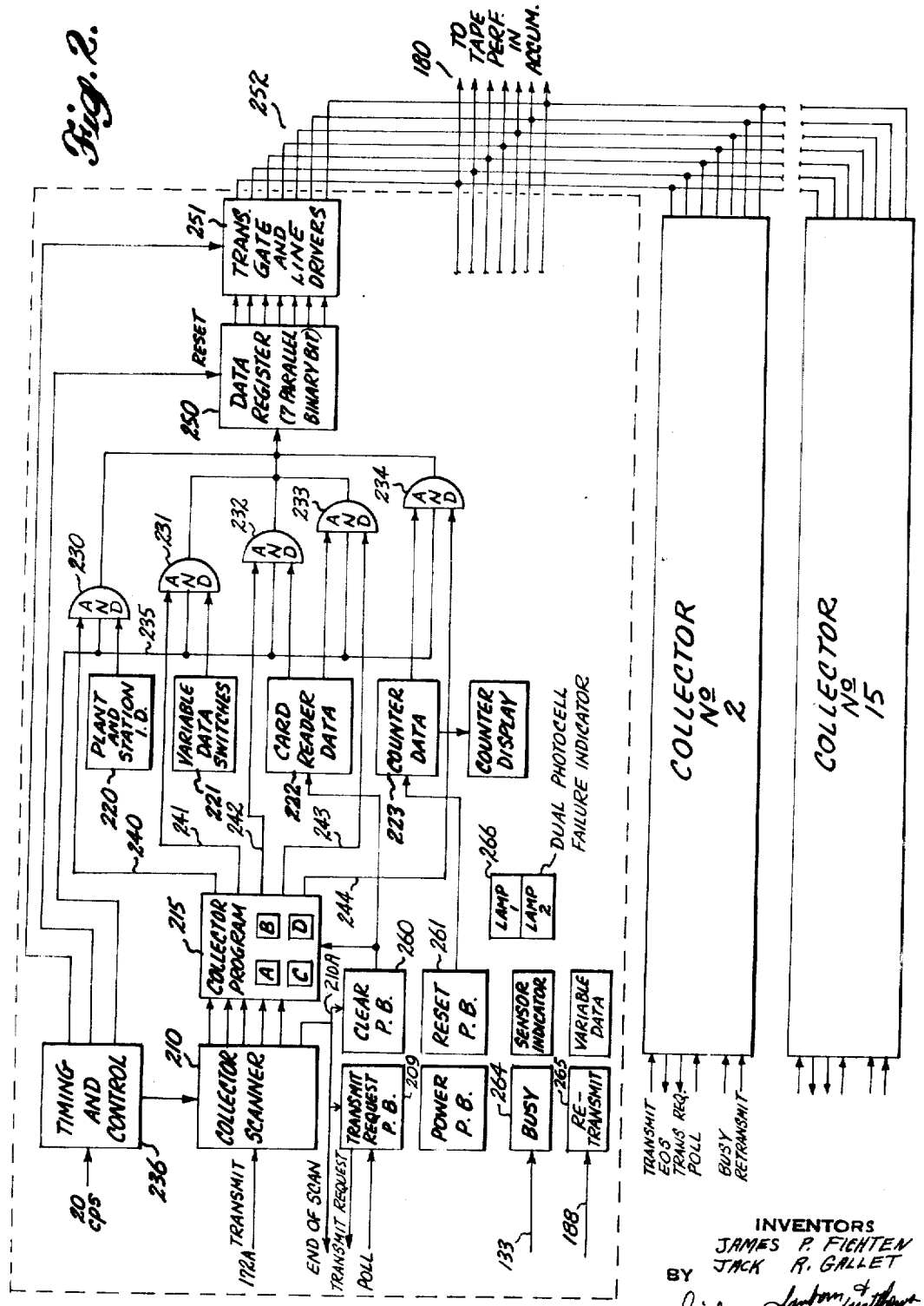
FIGURE 2 is a block diagram of a preferred form of data collector system adapted for use with the central accumulator of FIGURE 1.

Turning now to the drawings and in particular to FIGURES 1 and 2, the system aspects of the present invention will be described. While the system is not restricted to the number of collector stations which can be utilized for providing input data to the central accumulator, a system will be described using the necessary interconnections for three collector stations tied to the central accumulator. The collector stations are illustrated as being part of a fifteen station system and thus in FIGURE 2 it will be seen that the collector stations are numbered as collector Number 1, collector Number 2, and collector Number 15. Turning in particular to FIGURE 1, it will be seen that the system includes the transmit request lines 100, 101, and 115 with each line being connected to a transmit request push button such as the transmit request push button 109 of FIGURE 2 located within the collector Number 1. When it is desired to transmit data from a collector to the central accumulator, the operator pushes the transmit request push button causing a signal to be applied via the associated line to the input OR circuit 120 having its output line 121 connected to the reset circuitry of a bistable or flip-flop circuit 122. System operation is considered to be initially at a point such that no collector station is in the process of transmitting data to the central accumulator and thus the flip-flop 122 is in its reset condition. When a transmit request signal is received from one of the collector stations flip-flop 122 goes into its set condition causing an output signal on its set line 123 to be applied to the AND gate 125. The gate 125 is a three-level AND gate having one of its input circuits 126 connected to a time generator 127 for the receipt of 60 cycle per second gate pulses. The third input for the AND circuit 125 is the reset circuit 134 of a second flip-flop circuit 132 which is normally in its reset condition prior to the initiation of any accumulating function. Thus it will be seen that when the flip-flop 122 is reset by a signal from one of the collector transmit request lines, a signal will be applied by the output circuit 128 of the AND gate to the collector scanner 170. In practice the collector scanner can be a settable ring counter having a plurality of output circuits which are sequentially energized in response to repeated input pulses to the scanner. In the present system the output line 171 would be the first line energized by the collector scanner causing a signal to be applied via the line 171 to the two input AND gate 172. The second input for gate 172 comes from the OR gate 190 having as one input the line 173 from the transmit request line 100 of the Number 1 collector station. Thus the AND gate 172 opens and provides an output signal to the OR gate 174 having its output circuit 175 connected to the set side of flip-flop 132. The flip-flop 132 thus changes to its set state causing the reset signal from its output line 134 to be removed from the AND gate 125. Therefore further 60 cycle clock pulses for the collector scanner 170 are blocked by the AND gate 125 and the collector scanner effectively locks onto its output circuit 171.

It will be seen that the output circuit for the AND gate 172 includes a transmit line 172A connected in FIGURE 2 to the input of the collector scanner 210 described in greater detail hereinafter. In general, it can be stated at this time that the input signal to the collector scanner 210 causes that collector station to become operable for the transmission of data from the collector station to the accumulator over the seven parallel data transmission lines 180 seen as the output lines from the collector station of FIGURE 2 and as the input data lines for the central accumulator of FIGURE 1. As described in detail hereinafter, the system disclosed operates on the basis of the transferal of data from the collector to the central accumulator in binary form with the bits for each character or numeral being in parallel and with the various characters and numerals being transmitted sequentially.

As seen in FIGURE 1, the data transmission lines 180 are connected to a perforator control register 181 having its output circuits controlled by the gate circuits 182 in a manner such that the data in the register 181 will control the punches in one or the other of the two tape perforators 183 or 184 in accordance with the setting of the perforation selection and control device 185. A tape monitor 186 coupled with the two tape perforators 183 and 184 by the monitoring circuits 186A and 186B serves to detect a low tape supply or a broken tape in either of the perforators and in response thereto causes the selection and control device 185 to transfer the incoming data to the perforator which does not have the low supply or a broken tape. As is common in the art, a parity check circuit 187 is coupled with the output of the register 181 so that the gate 182 will not be opened unless the preestablished parity requirements are met by the data to be recorded. The parity check circuit 187 is not only coupled with the gate circuit 182 but is further provided with an output circuit 188 which goes to each of the collector stations to cause the then active collector station to retransmit its data in the event of a failure by the existing data to meet the parity requirements.

When the collector scanner 210 has completed its scanning of the data to be accumulated, it provides an end of scan signal on its end of scan line 211. As seen in FIGURE 1, the end of scan line 211 is applied via the OR cilrcuit 190 to the set input terminal of the flip-flop 152. The flip-flop 152 is normally in its reset condition and upon changing to its set condition the output line 153 thereof provides an opening signal for the AND gate 155. When the AND gate 155 opens a twenty cycle pulse on the input line 156 thereof passes through the gate and is applied by circuit 158 to the CR scanner 159. Scanner 159 is similar to the collector scanner 170 and may advantageously use an identical ring counter circuit arrangement (but having fewer stages) for operating the CR format control network 160. The format control network 160 is a selectively programmable network for providing in binary format such information as date, time of day, carriage return, and line feed data for a Teletype machine. The output circuit 161 of the CR format control 160 goes to the perforator control register 181 so that the desired information will be punched into the tape perforator for later processing on conventional equipment or for transmission via a Teletype machine to any designated location.

The last station scanned by the CR scanner 159 to its end of scan station. When the end of scan line 159A is energized, it will be seen that the FF 153 will be reset causing a signal on the line 154 to be applied to the CR scanner 159 causing the scanner to be reset to its initial condition. The end of scan signal from line 159A is also applied to the FF 132 as a reset signal so that the output line 134 of the FF 132 again opens the gate 125 for the collector scanner 170. Thus the collector scanner is in a condition for further scanning since the FF 122 is still in its set condition. If the collector scanner encounters another collector station which has been operated for transmission of data to the accumulator it will lock onto that station in the above manner. If not, the scanner 170 continues operating until its end of scan line 170A is energized. This causes FF 122 to reset and in turn the scanner is reset.

The end of scan line 159A from the CR scanner also goes to the CR format control network 160 so that an end of transmission code will be punched in the tape for later use by the computing equipment of Teletype machines commonly used for processing the output tape.

In most applications it is necessary that the equipment have the capability of permitting an operator at the central accumulator to poll the various collector stations at any selected time. It is also advantageous for the system to have the capability of causing automatic polling of the collector stations at predetermined time intervals. Thus the central accumulator includes a poll push button 140 as well as a clock controlled polling network 141 each of which has an output circuit connected to the set side of the FF 142. When the FF 142 is changed to its set condition, a signal is provided on its output line 143 which goes to the OR gate 190 as well as each of the corresponding OR gates having an individual transmit request line as an input. The line 143 also goes to the OR gate 120 so that a signal on line 143 effectively corresponds to depression of the transmit request push button in all collector stations. Thus each collector station is effectively asking for permission to transmit data to the central accumulator. When this occurs the above described collector scanning operation is performed with each of the collector stations sequentially providing its output data on the common data lines 180 for the tape perforators located in the central accumulator. The line 143 also carries the poll signal to a control relay in the program device of each collector, the details of which are set forth hereinafter.

When the collector scanner 170 has once been started in its scanning cycle by virtue of the above-notched conditions, it will be seen that it continues in its scanning operation until it reaches its end of scan line 170A. When the end of scan line 170A for the collector scanner is energized, the FF 122 is reset causing the collector scanner itself to be reset and also causing the FF 142 to be reset. Thus it will be seen that manual depression of the poll push button 140 or automatic operation of the clock poll control circuit 141 causes each of the collector stations to go into a transmit mode with the transmission from the various collector stations being sequential in accordance with the programming of the collector scanner 170.

In most operations it is necessary to have the ability to provide a header on the tape. Thus the present system includes a header push button 151 connected to the set terminal of the FF 162. When the FF 162 is placed in its set condition, one of the three necessary signals for opening the AND gate 165 is provided. If the FF 122 is in its reset condition (indicating that the collector scanner 170 is not in the process of scanning) the gate 165 will be opened and twenty cycle clock pulse singals will be applied to the header scanner 166. The header scanner then applies signals sequentially to the format control network 167 which for convenience is shown as including the data devices which provide input signals to the perforator control register 181. The header program 167 can be programmed for reading any desired data, such as day of the year, time, etc., and the same will be punched in the tape. When the end of the header scan operation occurs the line 166A is energized causing the FF 162 to be reset. The header scan be initiated at any time. However if the collector scan is operating the header scan will wait until the collector scan has been completed. If a collector transmit request is initiated during a header scan, the collector scan will be delayed until the header operation is complete.

Turning now to FIGURE 2, the details of one of the collector stations will be described. For purposes of explaining the present invention it will be seen that only one of the collector stations is shown in detail in FIGURE 2 with the collector stations Number 2 and Number 15 being shown only in block format to facilitate explanation of the system concepts. It is to be understood that in FIGURE 2 the blocks containing collector Number 2 and collector Number 15 could be identical to the apparatus shown in greater detail for the collector station Number 1.

When the collector scanner 210 receives a transmit signal from the collector via line 172A, it scans the collector program control 215 so that the various select lines on the output of the collector program control 215 are sequentially energized for the transmission of data to the central accumulator. For purpose of illustration the collector station Number 1 is shown as having a plant and station identification control 220, a set of variable data switches 221, a card member 222, and a data counter 223. The card reader may provide data such as an identification of the operator, an identification of a specific job being performed, as well as various other types of data which may be required depending upon the particular industry using the system. Similarly the counter data may relate to any automatically monitored information such as the number of board feet of lumber passing a given point, the number of feet of material passing a given point, the number of containers fabricated, as well as any other desired data derived directly by monitoring equipment mounted on or adjacent the manufacturing machines.

It will be seen that the select lines 240–244 from the collector program control 215 are respectively connected as an input to the AND gates 230–234. The output data from the data generation devices 220–223 are similarly respectively applied to the AND gates 230–234. Each AND gate 230–234 has a third input circuit connected to the timing line 235 which is provided with twenty cycle per second control pulses from the timing and control device 236 in each collector. Thus it will be seen that as the collector scanner 210 sequentially operates the scanner lines 240–244 in accordance with the program called for by the control unit 215 the AND gates 230–234 will be sequentially operated so that data will be applied to the data register 250. In practice, the data register 250 is a seven bit memory unit such as provided by seven FF circuits so that data from the various data generation devices will be temporarily stored in the register for subsequent transmission to the central accumulator. At a selected time the timing and control network 236 causes the transfer gate and line driver network 251 to open and transmit the contents of the register 250 via the output data transmission lines 252 to the common data transmission lines 180. Thus the data is transferred in parallel over the data transfer lines 180 to the tape perforator in the central accumulator.

It should be noted that only five gates 230–234 are illustrated in FIGURE 2. In practice, and as disclosed in greater detail hereinafter, each of the data generation devices 220–223 includes a plurality of numerical stages and thus provision is made for the readout of such plural order data to the data register 250 in the sequence determined by the collector program control network 215. Thus the program control network 215 in practice has a much greater number of select lines going to gates such as the gates 230–234.

It will be seen in FIGURE 2 that the collector has various indicator devices as well as a Clear push button 260, a reset push button 261 and a power push button 262. The Clear push button 260 serves to release the keys A–D within the collector program device 215 which may have been depressed by the operator for selecting a given program, and also serves to release any cards which may have been inserted in the card reader device 222. The reset push button 261 serves to reset the counter 223. The busy indicator light 264 by being connected to the line 133 from the accumulator serves to provide an indication that the accumulator is busy at any given time. Similarly the retransmit indicator 265 by being connected to the retransmit line 188 serves to provide an indication to the operator of a given collector station that he should retransmit the data. A dual photocell failure detector 266 described in greater detail hereinafter is also provided in the control section of the collector station.

Figure 3:
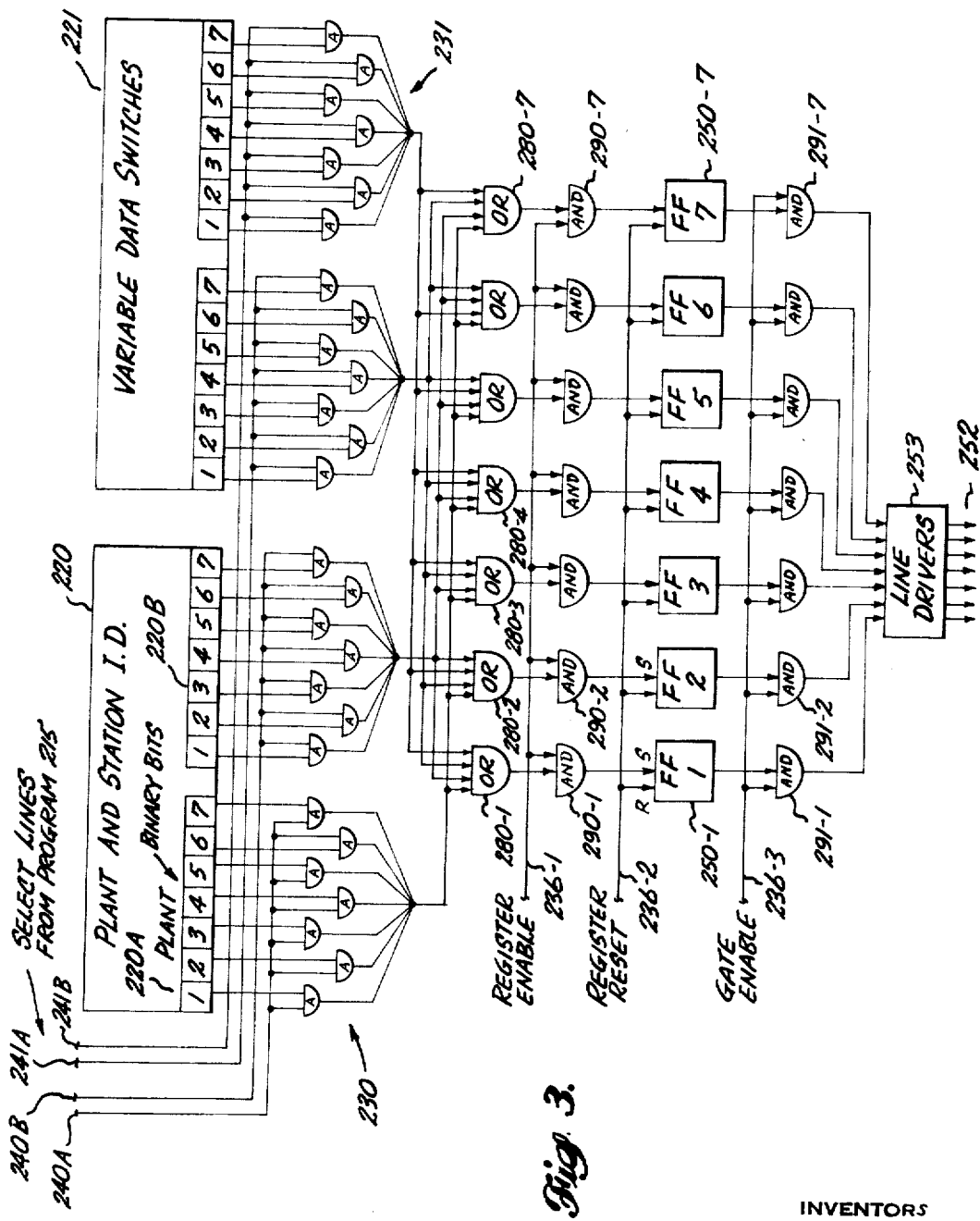
FIGURE 3 is a block diagram of the line select and output for the collector of FIGURE 2.

Turning now to FIGURE 3, more complete details of the manner in which the collector program 215 of FIGURE 2 controls the readout of data from the various data originating devices will be described. It will be seen in FIGURE 2 that the plant and station identification unit 220 includes a seven bit settable register 220A and a seven bit settable register 220B with the two registers being respectively set for the unique identification of a given station within a given plant in a manufacturing complex. Each of the seven bits corresponds to a settable binary register stage. In a similar manner the variable data switches 221 are shown for purpose of illustration as including two seven bit settable binary registers. The output from the plant and station identification registers are applied to the AND gates 230 and in a similar manner the settable switches 221 are coupled to the AND gates 231. The AND gates 230 and 231 are normally closed until a signal is provided on the associated one of the select lines 240A, 240B, 241A, or 241B from the program control unit 215. For example, when the select line 240A is energized with a select line signal, each of the AND gates from the register 220A will open so that the data from the register 220A will be applied through the OR gates 280–1 through 280–7. The signals are applied to the AND gates 290–1 through 290–7 so that when the register enable signal is applied to these AND gates the FF's 250–1 through 250–7 will be set to conditions corresponding to the data contained in the plant and station I.D. unit 220A. At a later time in the cycle when the gate enable line 236–3 is energized the AND gates 291–1 through 291–7 connected to the output of the data register FF's 250 will be opened so that the line driver circuits 253 will serve to transfer the data via lines 252 and 180 to the tape perforator in the accumulator section.

The above operation of the collector station when undergoing a sequence of operation will be more clearly understood by reference to the timing diagram of FIGURE 6. Therein it will be seen that clock pulse signals are applied at a predetermined rate to the collector scanner and various other circuits as indicated in FIGURE 2. At time $T_1$ (occurrence of a clock pulse signal) the timing and control network 236 provides a scanner advance signal 300 to the collector scanner causing the scanner to advance to the next select line in the sequence determined by the collector program 215. At time $T_2$ corresponding to the trailing edge of the scanner advance pulse 300 the signal 301 is applied to the data output register 250 causing that register to be reset. Starting at time $T_2$ and extending until time $T_3$ the register enable signal 302 is applied to the AND gates 290 (FIGURE 3) so that the data from a selected information originating device will be transferred to the output data register 250. Starting at time $T_3$ and extending until time $T_4$ the output gate enable signal 303 is applied to the output AND circuits 291 (FIGURE 3) so that the data in the register 250 will be transferred by the line drivers to the recording apparatus in the accumulator section. It will be seen that from time $T_1$ to time $T_5$ one of the line selection circuits from the collector program 215 will be energized (in the particular example the select line 240 going to the plant and station identification unit is energized). At time $T_5$ the above cycle of operation again starts with receipt of the second clock pulse signal at a time which corresponds to time $T_5$. While the particular timing for the operation of the collector systems can vary in accordance with a particular system, it has been found advantageous in one particular system to utilize a twenty cycle per second clock pulse rate since this works well in a system using tape perforators readily available on the market and which operate on the basis of twenty-cycle-per-second data recording.

Turning now to FIGURES 4 and 5, further details of one preferred embodiment of the collector scanner 210 and collector program unit 215 will be described. As seen in FIGURE 4, the collector scanner 210 includes a twelve stage ring counter 300 having stages 300-1 through 300-12. The ring counter can be any of a number of well known in the art and commonly referred to as a settable ring counter. Each of the stages of the ring counter is connected to the timing input line 301 as well as to the reset line 302. The arrangement is such that the various output select lines 240-244 are sequentially actuated once the ring counter has been started in operation and the timing signals from the timing and control network 236 of FIGURE 2 are applied. In practice the settable ring counters for the collector scanner 210 are conveniently placed on printed circuit boards with the circuit arrangements being such that the settable ring counters for the collector scanner 210 are also directly usable in the collector scan device of the central accumulator and shown as collector scan 170 in FIGURE 1. The specific details of the settable ring counters are well known in the art.

In the system of FIGURE 4 it will be seen that when the first stage of the ring counter has been activated the first order from the plant and station identification unit 220 will be interrogated. The line 303 from the first stage of the settable ring counter 300-1 passes a signal to the second stage so that the lines 240-A and 240-B will be operated in the manner previously described for recording of data. In the specific example of FIGURE 4 a transfer line 304 from the second stage of the settable ring counter goes to the common side of relay contacts P1, A1, B1, C1, and D1 which are respectively associated with relays actuated in response to operation of the collector program relays 305-308 or the poll relay 309 which is operated in response to the previously described poll signal. For purpose of illustration of the various relay contacts controlled by the relays 305-309 are arranged for causing the selection of data in accordance with the chart of FIGURE 5. For example, it will be seen that when the poll relay 309 is energized its contacts P1 and P3 will be closed. Thus the plant and station select lines 240-A and 240-B will be energized, a signal will be provided via line 304 and contacts P1 to the line 310 so that the counter lines 244A and 244B will be sequentially energized. Following the counter readout a signal is provided via line 311 and contacts P3 to the end of scan line 312. Thus in the chart of FIGURE 5 it will be seen that the poll operation results in interrogation of the plant and station identification units 220 and of the counter unit 223.

In a similar manner operation of the manual program control buttons A, B, C, D, of FIGURE 2 causes the associated relay contacts of FIGURE 4 to be closed and hence the data selection indicated in FIGURE 5 is accomplished. In practice the push buttons in the collector program unit 215 (FIGURE 2) is illuminated upon depression of the button so that the operator is assured of the specific program having been selected. As is well known in the art, a hold-in set of contacts are associated with the push button so that the push button is released after the scan operation for the selected program has been completed. The end of scan signal on line 210A (FIGURE 2) thus goes to push buttons 209 and 260 to cause release thereof. In one particular application of the system disclosed herein the collector stations were utilized for monitoring the operation of container fabricating machinery and thus the movement of paper through the machine was being monitored. Photocell devices are typically used for monitoring the movement of such materials with a light source being directed against the moving material and with the photocell being responsive to reflected radiation to indicate the presence of the material. In order to assure continued operation of the photocell sensing equipment and avoid the problems inherent in such a system when the illuminating lamp fails, the system of the present invention utilizes two illuminating lamps in parallel with the indicator devices 266 of FIGURE 2 being connected in circuit with the illuminating lamps to provide an indication of proper lamp operation. Should one of the two illuminating lamps fail the associated indicator lamp 266 is energized so that the operator can then replace the burned out lamp without the need for machine down time. In view of the remote likelihood of both illuminating lamps associated with the photodetector failing at the same time, it will be seen that the dual photocell failure indicator arrangement materially improves the operation and reduces the likelihood of machine down time necessitated by failure of the photocell illuminating lamp.

There has been disclosed an improved monitoring and data acquisition system particularly well suited for providing updated manufacturing data from many locations in an industrial plant. While the invention has been disclosed by reference to a presently preferred embodiment it is of course understood that those changes and modifications which becomes obvious to a person skilled in the art as a result of the teachings hereof are intended to be encompassed by the following claims.

What is claimed is:

1. A system for collecting and recording manufacturing data from a plurality of locations comprising in combination: a plurality of data collector units each having a plurality of data signal generating devices operative to provide output data signals, a first plurality of signal output lines coupled with said devices, first signal output gate means, collector program control means coupled with said output gate means and with each of said devices and operable in response to a data transfer signal to sequentially interrogate selected devices and to apply the output data signals from each selected device to said signal output gate means, and selectively operable data transfer request signal generating means; a plurality of data transfer lines each connected to the said signal output gate means of each of said collector units; a central data accumulator having data recording means connected to said data transfer lines, collector unit selection means coupled with the data transfer request signal generating means and with the collector program control means of each of said collector units, said collector unit selection means including collector scan means responsive to receipt of a transfer request signal from a collector unit to initiate a scan operation and send a data transfer signal to the collector program control means of a collector unit having transmitted a data transfer request signal, first control means connected to said scan means and responsive to selection of a collector unit by the scan means to provide a stop scan signal to said scan means and thereby interrupt further scanning; and of scan signal means in each said collector unit coupled with said accumulator and providing an end of scan signal to said accumulator when the last device selected by the associated collector program means has been interrogated; and second control means in said accumulator coupled with each of said end of scan means and responsive to an end of scan signal to generate an end of transmission signal; means applying said end of transmission signal to said first control means, said first control means being responsive to said end of transmission signal to terminate said stop scan signal.

2. A system as defined in claim 1 wherein said second control means includes format control and signal generating means coupled with said recorder and operative in response to an end of scan signal from a collector unit to provide selected data to said recorder and then to apply said end of transmission signal to said first control means.

3. A system as defined in claim 2 including signal circuit means connecting said second control means to each of the data transfer request signal generating means, and wherein said second control means includes means for applying said end of transmission signal to said units.

4. A system as defined in claim 1 wherein said accumulator includes means providing a busy signal to each collector unit when said stop scan signal is applied to said collector scan means.

5. A system as defined in claim 4 wherein said first control means includes a bistable circuit coupled with said collector scan means for providing said stop scan signal thereto when said bistable circuit is in a first condition, and said bistable circuit is coupled with each collector unit and provides a busy signal thereto when said bistable circuit is in its said first condition.

6. A system as defined in claim 5 wherein said bistable circuit is connected to said second control means and is set to its second condition in response to said end of transmission signal.

7. A system as defined in claim 1 wherein each of said collector units includes a poll control relay responsive to an applied poll signal to operate the transit request signal generating means of the associated unit and to set the collector program control means of the associated unit for interrogation of selected signal devices in a predetermined sequence, and said accumulator includes selectively operable poll control means connected to each of said poll control relays and adapted to apply a poll signal thereto.

8. A system as defined in claim 7 wherein each of said units includes a retransmit indicator, and wherein said recording means includes data signal monitoring means coupled with each of said data lines and with each of said retransmit indicators and operative to energize a retransmit indicator unless the signals on said data lines satisfy predetermined conditions.

9. A system as defined in claim 1 wherein each said collector program control means includes a collector program scanner and each said end of scan signal means includes an output line from an associated collector program scanner.

10. A system as defined in claim 9 including: a first bistable circuit in said accumulator connected to each of said data transfer request signal generating means and settable to a first condition in response to a signal from any of said transfer request signal generating means; a second bistable circuit in the first control means of said accumulator coupled with the output of said scan means and setttable to a first condition in response to selection of a collector unit by said scan means; and means including an "AND" gate connected between said scan means and each of said bistable circuits and operative to periodically advance said scan means for selection of a different collector unit only when said first bistable circuit is in its said first condition and said second bistable circuit is not in its said first condition.

11. A system an defined in claim 1 wherein: said scan means has a plurality of output lines and said collector unit selection means includes a plurality of "AND" gates each having a first input connected to a different one of said output lines and each having a second input connected to a different one of said data transfer request signal generating means; and a plurality of control lines each extending from the output of a different one of said "AND" gates to one of said collector program control means for applying a data transfer signal to that collector unit in response to opening of the associated "AND" gate.

12. A system an defined in claim 11 wherein said first control means includes a first bistable circuit connected to each of said "AND" gates and settable to a first condition in response to a signal from any one of said "AND" gates, and means connected between said bistable circuit and said scan means operative to prevent advance of said scan means when said bistable circuit is in its said first condition.

13. A system as defined in claim 12 wherein each of said collector units includes a busy indicator, and circuit means connecting said bistable circuit to each of said busy indicator means and operative to energize each said busy indicator means when said bistable circuit is in its said first condition.

14. A system as defined in claim 13 wherein said collector unit selection means includes a second bistable circuit connected to each of said second input lines of said "AND" gates and settable to a first condition in response to a transfer request signal from any collector unit, and wherein said last named circuit means of claim 13 is coupled with said second bistable circuit and advances said scan means when said second bistable circuit is in its first condition and said first bistable circuit is not in its said first condition.

15. A system as defined in claim 14 including an output circuit from said scan means connected to said second bistable circuit and operative when energized by said scan means to place said second bistable circuit in a second condition, and scan reset circuit means connecting said second bistable circuit with said scan means to reset said scan means when said second bistable circuit is in its second condition.

References Cited

UNITED STATES PATENTS

| 3,344,408 | 9/1967 | Singer et al. | 340—172.5 |
| 3,387,277 | 6/1968 | Singer et al. | 340—172.5 |
| 3,438,019 | 4/1969 | Gowan | 340—172.5 XR |
| 3,449,725 | 6/1969 | Eckelamp et al. | 340—172.5 |

PAUL J. HENON, Primary Examiner

H. E. SPRINGBORN, Assistant Examiner